United States Patent [19]
Gillett

[11] Patent Number: 5,317,477
[45] Date of Patent: May 31, 1994

[54] HIGH DENSITY INTERCONNECTION ASSEMBLY

[75] Inventor: John B. Gillett, Woodstock, N.Y.

[73] Assignee: International Business Machines Corporation, Armonk, N.Y.

[21] Appl. No.: 906,971

[22] Filed: Jun. 30, 1992

[51] Int. Cl.⁵ .......................... H05K 7/10; G06F 1/16
[52] U.S. Cl. .................................... 361/683; 361/788; 395/800
[58] Field of Search ..................... 364/708.1; 361/679, 361/683, 684, 686, 735, 784, 785, 788, 803, 829; 395/325, 800

[56] References Cited

U.S. PATENT DOCUMENTS

| | | | |
|---|---|---|---|
| 3,851,221 | 11/1974 | Beaulieu et al. | 361/684 |
| 3,949,274 | 4/1976 | Anacker | 361/735 |
| 4,730,232 | 3/1988 | Lindberg | 361/688 |
| 4,972,298 | 11/1990 | Casa et al. | 361/686 |
| 5,058,053 | 10/1991 | Gillett | 361/684 X |
| 5,168,347 | 12/1992 | Gillett | 361/688 |

FOREIGN PATENT DOCUMENTS 9104790 7/1991 Fed. Rep. of Germany.

OTHER PUBLICATIONS

System Architecture of a Reconfigurable Multimicroprocessor Research System, V. A. Trujillo, Proceedings of the International Conf. on Parallel Computing, Aug. 24, 1982, pp. 350-352.
Donner et al., "Board-To-Board Interconnects in a Thermal Conduction Module System", *IBM Technical Disclosure Bulletin*, vol. 32, No. 3B, Aug. 1989, pp. 464-467.
Carter et al., "High Performance Parallel Planar Package", *IBM Technical Disclosure Bulletin*, vol. 21, No. 3, Aug. 1978, pp. 1137-1138.
Baust et al., "Implementing a Packaging Strategy for High-Performance Computers". *High Performance Systems*, no date given.
Gillett, "High Performance Computer System Package", Application Ser. No. 07/675,583.

*Primary Examiner*—Leo P. Picard
*Assistant Examiner*—Michael W. Phillips
*Attorney, Agent, or Firm*—Floyd A. Gonzalez; Robert L. Troike

[57] ABSTRACT

A high density computer interconnection assembly is provided by a plurality of flat packages slidably mounted along a rack in a frame in one given plane. The packages include edge connected processors and switch modules with associated power supply. One or two interconnection wiring circuit boards extend perpendicular to the one given plane and adjacent and along the edge of the edge connected modules to couple thereto whereby the interconnection circuit board couples said switch modules to said processor modules along one broad surface of said interconnection circuit board. Memory cards are coupled to the opposite broad surface of the interconnection circuit board.

8 Claims, 7 Drawing Sheets

HIGH DENSITY INTERCONNECTION ASSEMBLY

STATEMENT OF INVENTION

This invention relates to electronic assemblies and more particularly to an assembly with edge connected modules.

BACKGROUND OF THE INVENTION

The trend in high performance computers is to use increasing numbers of processors operating common memory modules referred to sometimes as Basic Storage Modules (BSM). The coupling between these processors and common memory modules is by some form of network. The coupling can be tightly coupled or loosely coupled. IBM Corporation System/390 TM 9000 Series (System/390 is a trademark of International Business Machines Corporation) family is an example of a tightly coupled multi-processor system. In a tightly coupled system the processors share real storage, are controlled by the same control program, and can communicate directly with each other. In a tightly coupled system there may be N processors and M BSMs. All processors have equal access to a BSM through some form of N×M switch, such as a cross-bar switch to select the path between a given processor and a currently addressed memory for storing and fetching data. In loosely coupled systems the processors share access to direct access storage and are coupled, for example, by channel to channel adapters for passing control information. This present invention is most suitable for tightly coupled applications.

The performance parameters of most importance to the system are the processor cycle time, bandwith, electrical path length, round trip delay and timing skew. The cycle time is minimized by placing the cycle determining path elements in the closest possible proximity to each other. The bandwidth between processor and memory is achieved by using the fastest data rate over a large number of parallel connections between processors and switches and between switches and BSMs. The electrical path length is the length between data latching points on different, but interconnected, functional units as measured in nanoseconds. The total round trip delay from a processor to a memory and back is known as the memory latency. The skew is the electrical path length differences due to variations in routing from one point to another.

Applicant's U.S. Pat. No. 5,058,053 shows one system for providing some of these parameters of importance in a system with unidirectional information flow through the memory modules. Applicant has other pending applications with plural memory modules, BSMs and request and response switches. They are: U.S. application Ser. No. 07/675,583 filed Mar. 26, 1991 entitled "High Performance Computer System Package" and U.S. application Ser. No. 07/675,243 filed Mar. 26, 1991 entitled "Integrated Circuit Chip Package Having Signal Input/Output Connections Located at Edges of the Substrate," now U.S. Pat. No. 5,168,347. These applications are incorporated herein by reference. This present invention provides shorter path lengths between processors and BSMs.

SUMMARY OF THE INVENTION

In accordance with one embodiment of the present invention a high density assembly includes a rack frame with orthogonal members. The frame has multiple pairs of slidable guide members, each pair in one given plane, and a plurality of flat packages are slidably mounted in said frame in the guide members. Each package includes power supply means and an edge connected module extending in said one given plane beyond the frame. The edge connected modules include a plurality of multicircuit semiconductor chips mounted on a carrier and having connection means along the edges. A planar circuit board extends perpendicular to said one given plane mounted forward of the frame juxtapositioned to said edge connected modules. The circuit board includes connectors facing the edge connected modules and coupled to the edge connection means along the edges. The circuit board has coupling means between opposite broad surfaces thereof to couple signal from one side of the board to the other via a network. A plurality of memory circuit cards having connectors along one of the edges are coupled to the circuit board on the surface opposite the side coupled to said edge connected modules.

DESCRIPTION OF THE PREFERRED EMBODIMENTS

Figure 1:
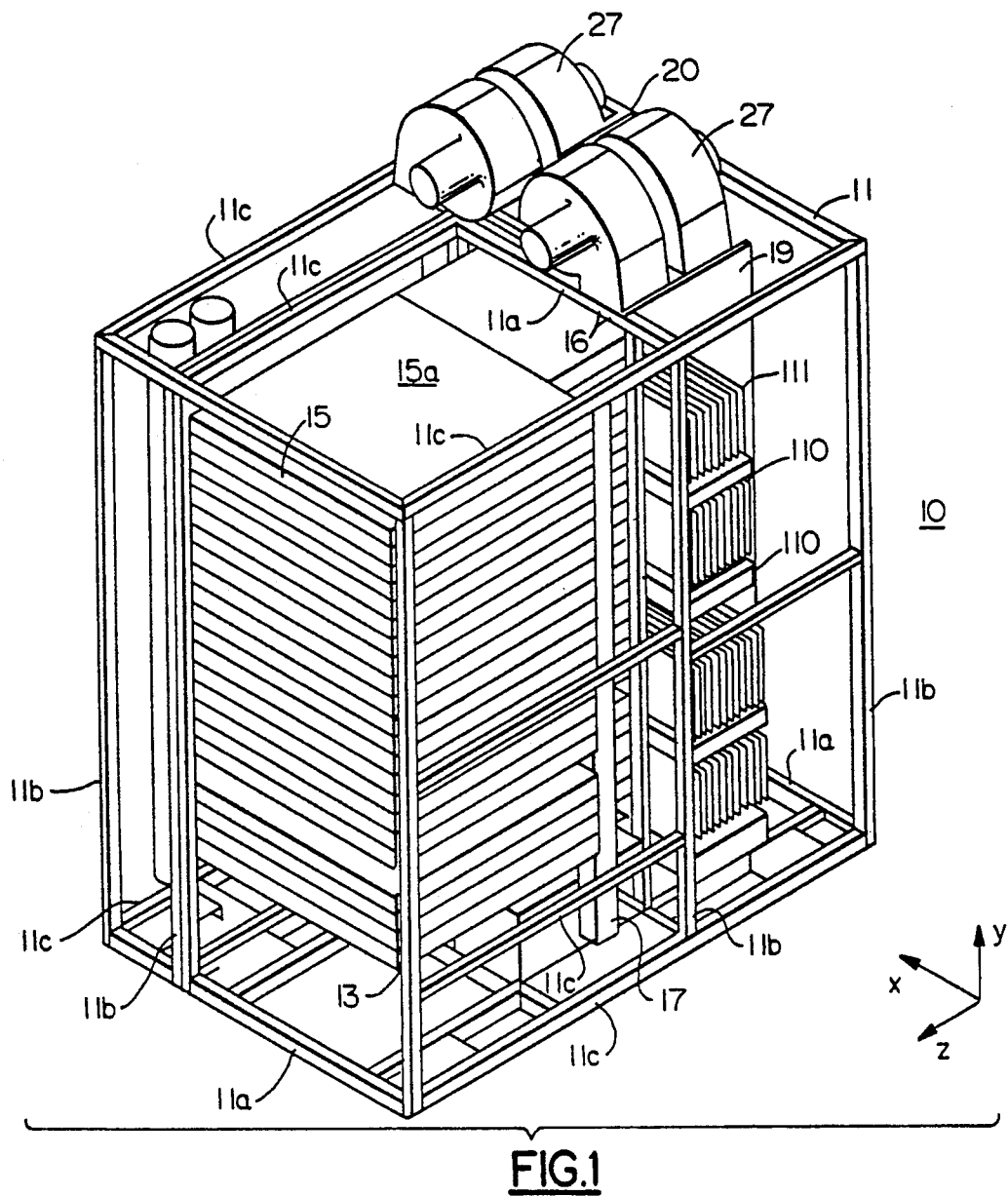
FIG. 1 is an isometric sketch illustrating the system according to the present invention with a support rack.
Figure 1A:
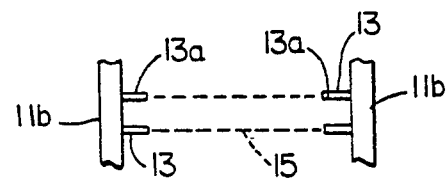
FIG. 1A illustrates a portion of the support rack.

Referring to FIG. 1 there is shown the support system 10 with a support frame 11 comprising orthogonal elements 11a, 11b and 11c extending in respective three XYZ directions. The support frame 11 includes support racks 13 fixed to vertical members 11b extending in the Y direction (see FIG. 1A). The racks 13 comprise channel support elements 13a fixed in the X direction or horizontal plane and in the Y-direction or vertical plane to the vertical members 11b, as shown in FIG. 1a. Planar packages 15 are slid into these racks 13. A power bus 17 extends parallel to the vertical support elements 11b in the Y direction that couples power via connectors 15c (see FIG. 4) to the packages 15 in the racks 13. Horizontal members 11a extend in the X direction and cross the vertical members 11b at top and bottom of the frame 11. Members 11c extend in the front to back or Z direction.

Figure 2:
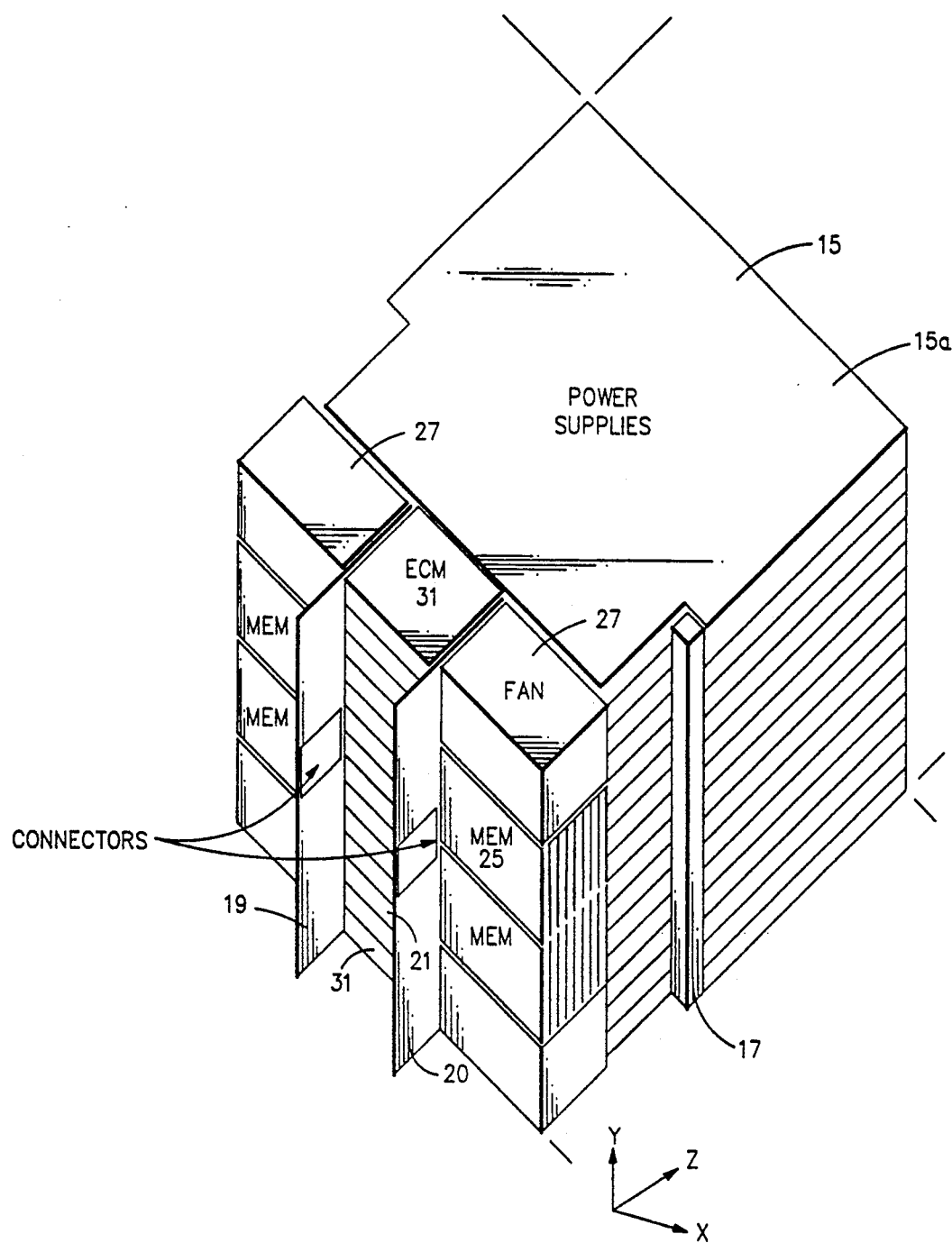
FIG. 2 is an isometric sketch showing the front of the system according to the present invention with the support frame removed.
Figure 3A:
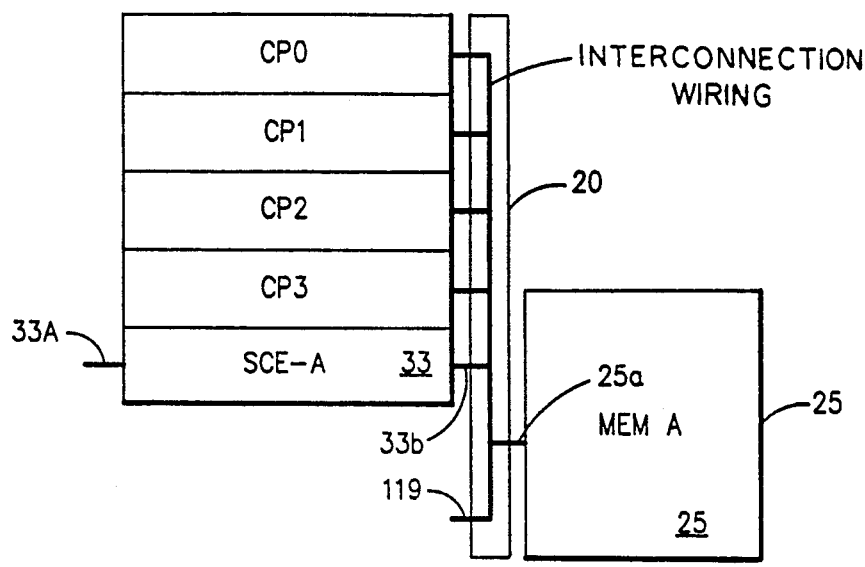
FIG. 3A is a front elevation functional sketch illustrating placement of system elements in a four-way cluster.
Figure 3B:
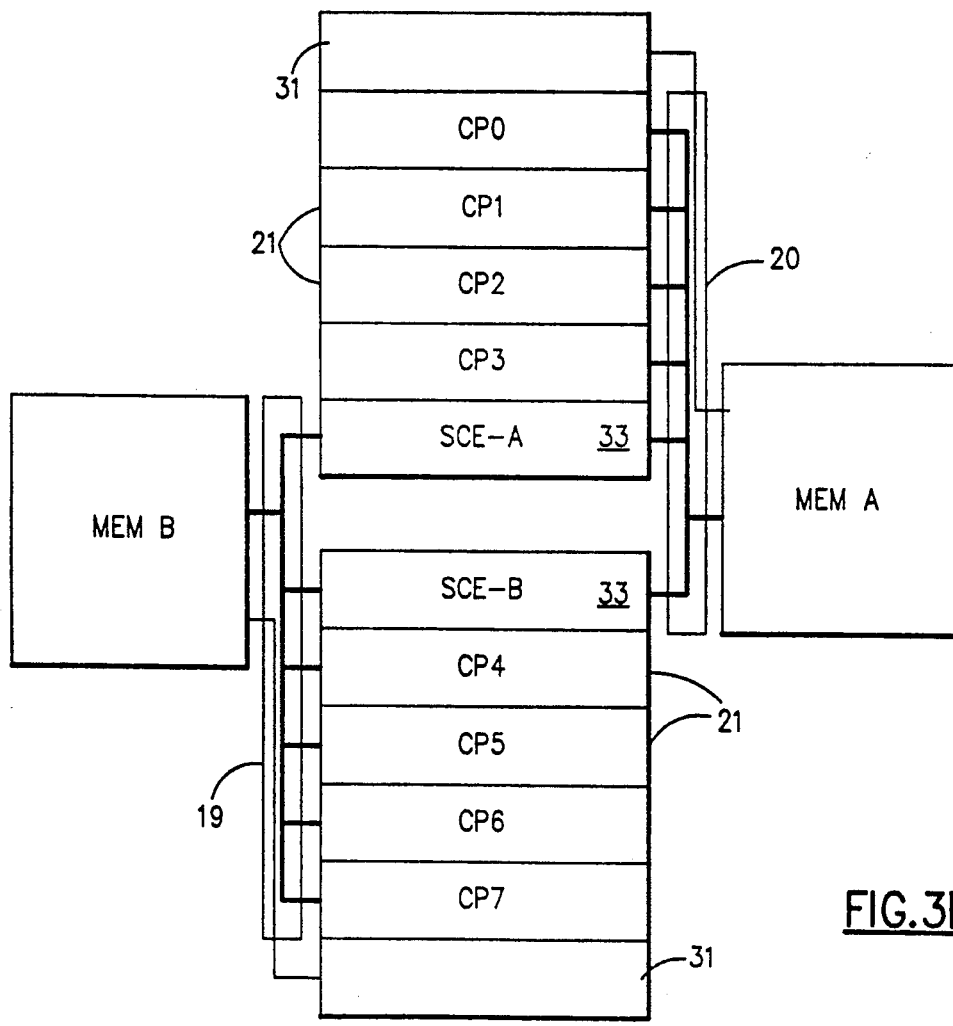
FIG. 3B is a front elevation of two identical four-way clusters tightly coupled.
Figure 4:
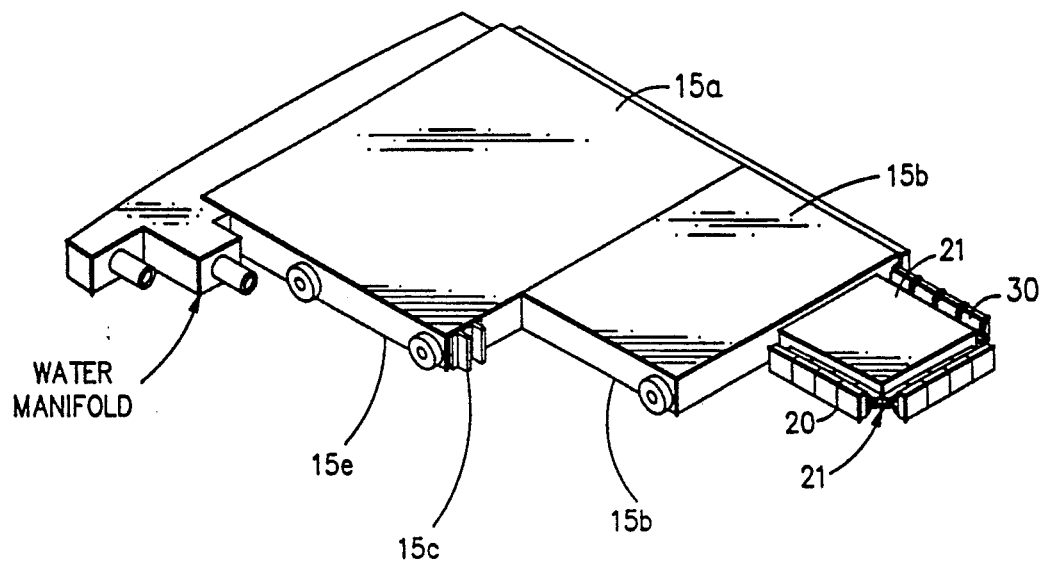
FIG. 4 is a sketch of a package including an edge connected module in the system of FIGS. 1-3.
Figure 5:
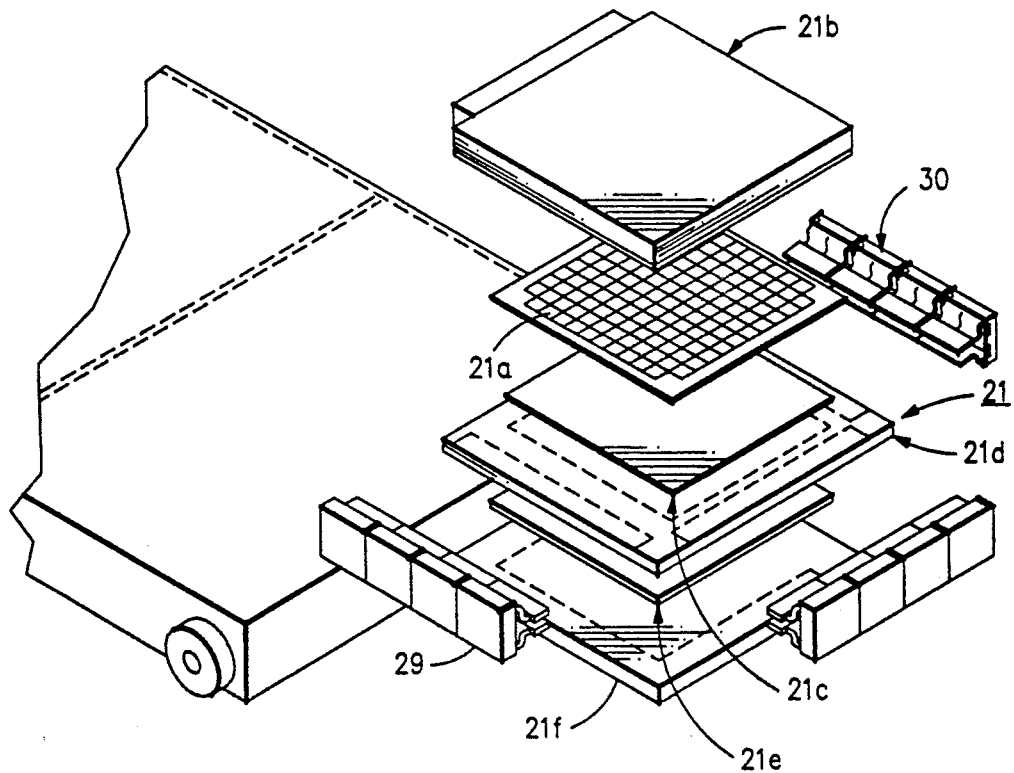
FIG. 5 is an exploded view of the edge connected module of FIG. 4.
Figure 6:
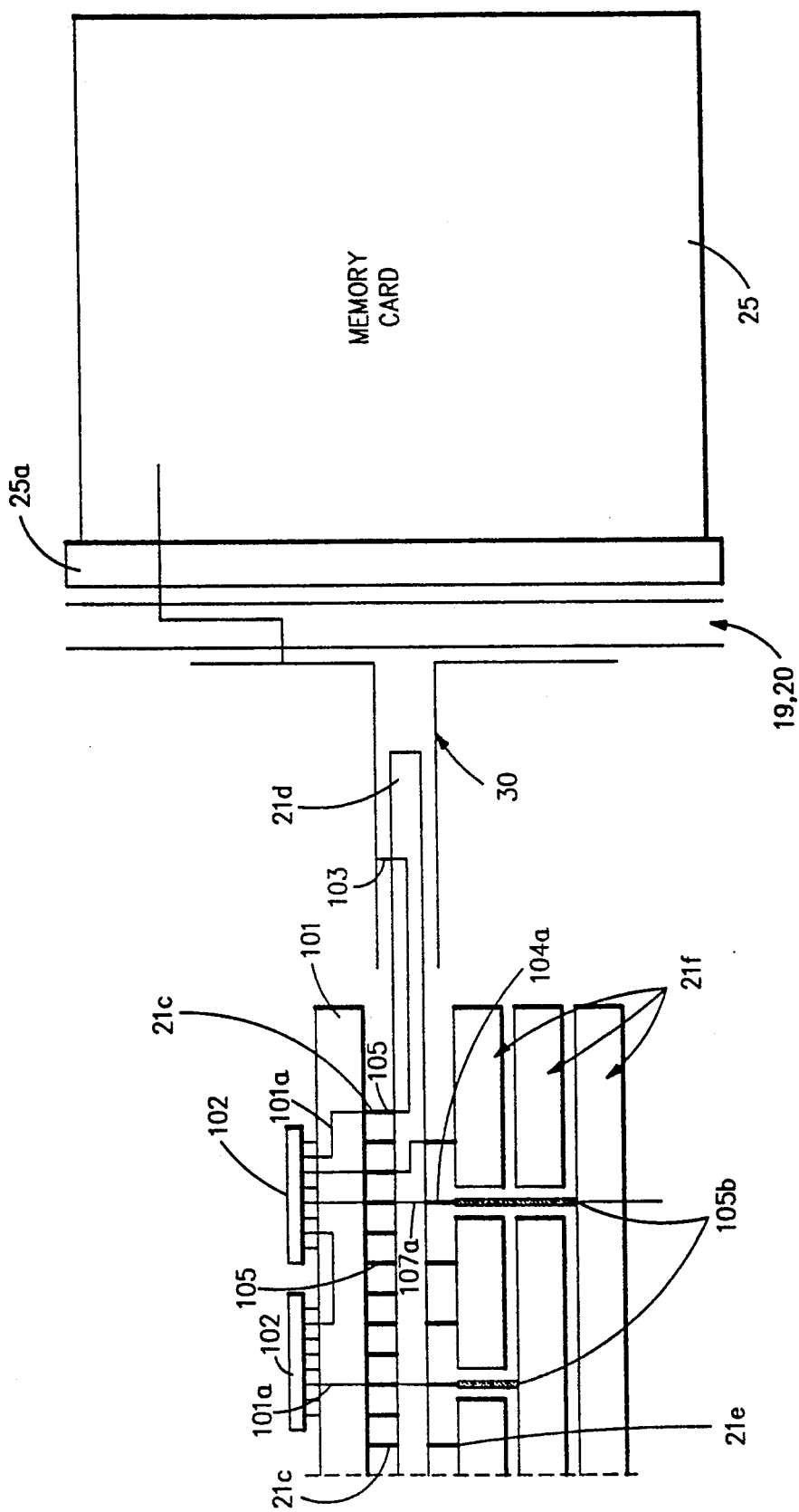
FIG. 6 is a sketch of the power planes and wiring to couple the signals and power in the edge connected module of FIG. 5, and it illustrates the circuit board interconnections between the memory cards and the modules.
Figure 7:
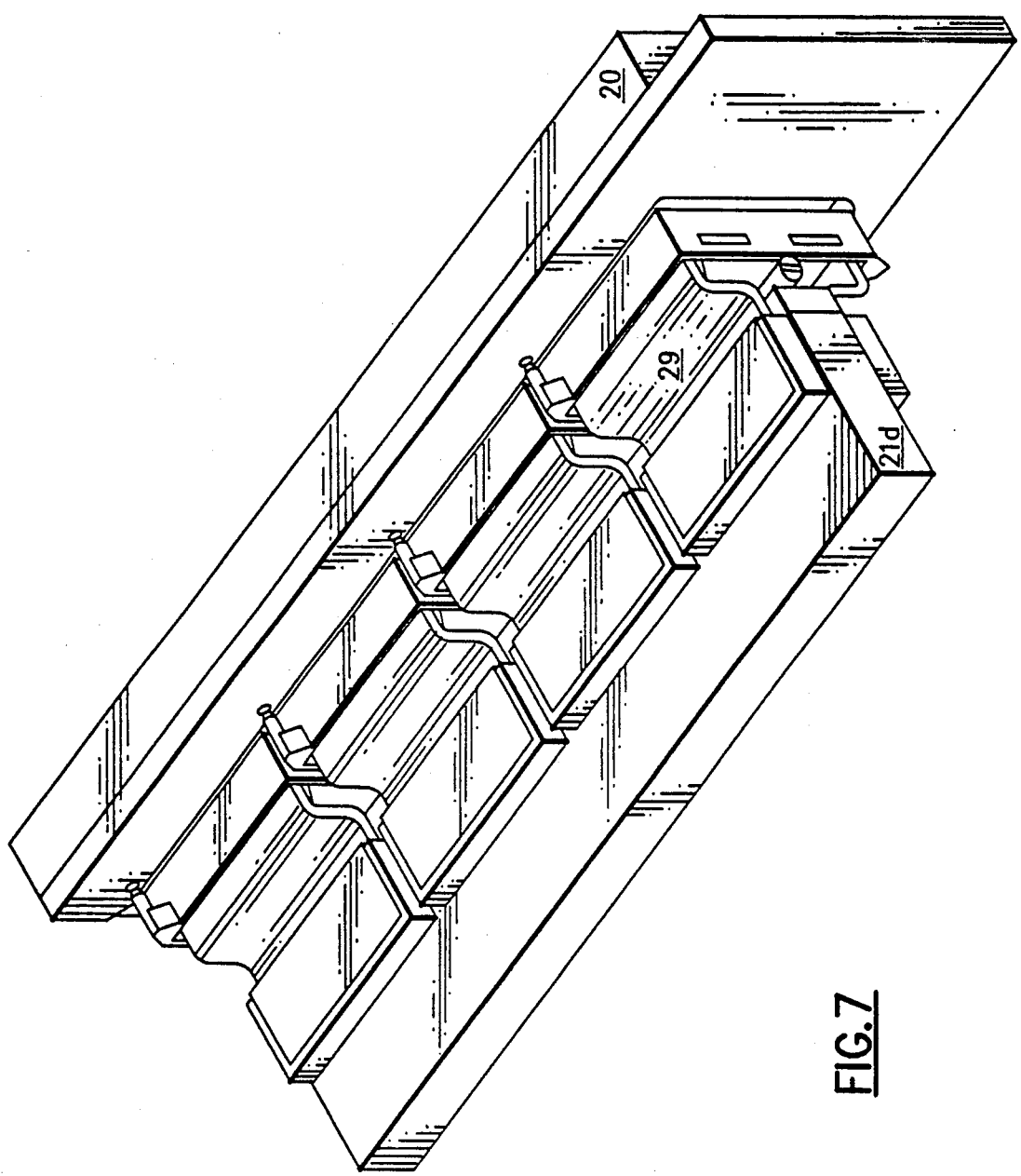
FIG. 7 illustrates the flex connector of FIG. 5.
Figure 8:
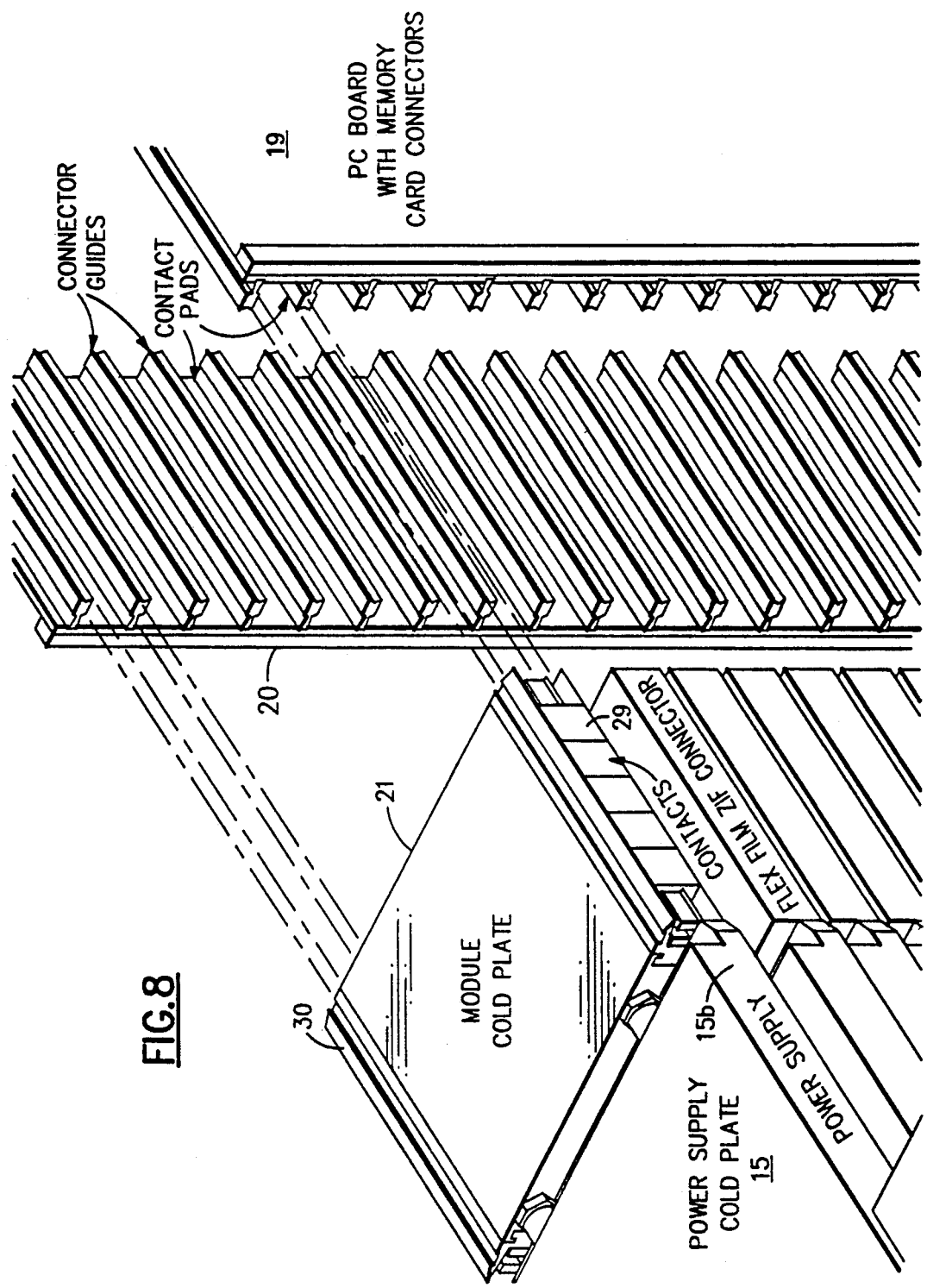
FIG. 8 illustrates the insertion of the edge connected package into the PC

Referring to FIGS. 2, 3A and 3B, there is illustrated the system 10 without the frame 11. The planar packages 15 include a power supply section 15a joined to the power bus 17 to supply power to the power supply sections of the packages. The section 15a extends in the Z direction from the rear of the support frame 11 to cross support elements 16 of elements 11a as shown in FIG. 1. A pair of circuit boards 19 and 20 are mounted to these cross members 16 such that the boards extend in the YZ plane orthogonal to the front face of the frame 11. The packages 15 include edge connected modules (ECMs) 21 extending from the power supply sections 15b and when mounted in the frame 11 extend forward of the orthogonal members 16 in FIG. 1. The edge connected modules (ECM) 21 extend in the XZ plane between the circuit boards 19 and 20. These ECMs are each powered by the corresponding power supply in sections 15a and 15b of the same package 15. The ECMs, as the names imply, have edge connected input and output connectors 29 and 30 as shown in FIGS. 4 and 5. These edge connectors are coupled to one or both of the circuit boards 19 and 20 on the broad surfaces facing each other. The ECMs are fixed to the power supply sections 15a and 15b of the package 15 and the whole package 15 is slid in position from the rear in the Z direction so that the package 15 is supported in the channels 13a and the ECM is slid between ZIF (Zero Insertion Force) edge connectors 29 and 30 on the circuit cards 19 and 20. The module 21 includes the array of chips 21a, cooling plate 21b, an array interposer connector 21c, a high density board 21d, a power interposer connector 21e and power planes 21f. Referring to FIG. 6 there is a sketch showing how these elements are connected. The chip 102 is on the substrate 101. This combination forms the array 21a with the other chips. The cooling plate 21b is above the chip. The surface input/output pads 103 are on the surface of board 21d and these input/output pads are coupled to interposer wires in array interposer 21c and the substrate 101 has vias 101a coupling the array interposer wires 105 in interposer 21c to the chips 102. The power for the arrays is coupled via the power planes 21f through vias 105b to the power interposer wires 104a to the board 21d and via the board 21d vias 107a to the wires 105 of the array interposer connector and through vias 101a separate from the signal carrying vias to the chip 102. The ZIF film connectors 29 or 30 are shown in FIGS. 7 and may be like those shown and described in applicant's joint U.S. Pat. No. Re. 33,604 or U.S. Pat. No. 5,123,852, Ser. No. 07/702,258, filed May 17, 1991, entitled "Modular Electrical Connector". These patents are incorporated herein by reference. The flex-film connector couples to the PC board 19 or 20 and the board couples over the card connector to the memory card 25.

In FIG. 3A there is illustrated a four-way cluster with the processor ECMs (CPO-CP3) near the top and the switch module SCE-A 33 at the bottom. The interconnection wiring circuit board 20 couples to the memory cards 25, the processor modules CP0-CP3, switch module 33 and to connector 119 for connection to a second switch module. The switch module SCE-A also has connectors 33a for connection to a second memory card.

The ECMs as shown in FIG. 3B for two tightly coupled four-way clusters are stacked in the rack with two central ECMs 21 containing the SCE or switch control elements 33 (SCE-A and SCE-B) and the upper four and lower four ECMs 21 (CP0–CP7) containing the processor elements. In accordance with one embodiment of the present invention, these processor ECMs 21 contain a combination of scalar, vector and crypto type processor elements. The top most and bottom most ECMs 31 contain the memory power supplies. Memory cards 25 are mounted in the XY plane orthogonal to the printed boards 19 and 20 and have connectors along one edge to couple into the circuit boards 19 and 20 on the side opposite that of the edge connectors for the ECMs. The connectors 25a for the memory cards are adjacent to the center packages containing the SCE 33 ECMs.

The memory cards 25 are stacked in the Z direction as shown in FIG. 1. Either above or below these memory cards in the Y direction are the fans 27 to cool the memory cards, and if need be, additional memory power supplies. As shown in FIG. 4 a water manifold provides cooling water to the power supply sections of the packages 15 and the ECMs include a cooling plate 21b as shown in FIG. 5. The power planes in the ECM are coupled into the power supply portions. There are vias or feedthrough pins that carry the power from the power planes in the ECMs to the chips arrays. These vias and power planes are shown in copending application Ser. No. 07/675,243 and continuing application Ser. No. 07/873,530 filed Apr. 21, 1992. The frame 11 includes air chillers 110 (FIG. 1) extending in the XZ plane that are fixed to the front surface of the front vertical member 11b that direct air through the cards. The SCE can be request and response switches like that shown in FIGS. 3 and 5 in U.S. Pat. No. 5,058,053 of Gillett, incorporated herein by reference.

While the invention has been particularly shown and described with reference to preferred embodiments thereof, it will be understood by those skilled in the art that various changes in form and details may be made therein without departing from the spirit and scope of the invention.

I claim:

1. A computer assembly with shortened path lengths between computer elements comprising:
    a rack frame,
    a plurality of flat packages slidably mounted to the frame along one given plane, said packages comprising a planar power supply module coupled to a planar edge connected module with said power supply module providing power to said edge connected module, said edge connected module includes a plurality of multicircuit semiconductor chips mounted on a carrier and having connection means along one or more edges of said edge connected module, said edge connected modules being processor modules and switch modules,
    a planar interconnection wiring circuit board extending perpendicular to said one given plane mounted juxtapositioned to the connector edge of said edge connected modules and coupled thereto on one broad surface to thereby provide coupling between said switch modules and processor modules, and
    a memory card coupled to the opposite broad surface of said circuit board whereby coupling between said switch modules and said memory card is across the thickness of the planar interconnection wiring circuit board.

2. The computer assembly of claim 1 wherein said switch modules are located near one end of the assembly and processor modules are located near the other end.

3. The computer assembly of claim 2 wherein said memory cards extend in a plane perpendicular to said one given plane and perpendicular to the plane of the planar circuit board.

4. The computer assembly of claim 2 including a second planar interconnection wiring circuit board extending perpendicular to said one given plane and parallel to said planar circuit board for coupling said edge connected modules to said switch edge connected modules, and second memory cards coupled to the opposite broad surface of said second interconnection wiring circuit board whereby coupling between said switch modules and memory is across the thickness of the planar interconnection wiring circuit board.

5. The computer assembly of claim 4 wherein said processor modules coupled to said second interconnection wiring board and to said second memory cards are at an end opposite to those processor modules coupled to the first mentioned interconnection wiring board and said first memory card.

6. The computer assembly of claim 2 wherein said switch module is nearest to said memory card and said switch module has coupling means at opposite ends thereof for connection to said interconnection wiring circuit board and said interconnection wiring circuit board includes connection means nearest said memory card for coupling said memory card to a second switch module.

7. The computer assembly of claim 6 including said second switch module coupled to said interconnection wiring circuit board, a second planar interconnection wiring circuit board extending parallel to said interconnection wiring circuit board coupled to different set of said processor modules and to said switch module and said second switch module, a second memory card coupled to both said switch modules and said second switch module via said second interconnection wiring circuit board.

8. The computer assembly of claim 1 wherein said memory cards extend in a plane perpendicular to said one given plane and perpendicular to the plane of the planar circuit board.

* * * * *